United States Patent [19]

Barmatz et al.

[11] Patent Number: 4,549,435
[45] Date of Patent: Oct. 29, 1985

[54] VIBRATING-CHAMBER LEVITATION SYSTEMS

[75] Inventors: Martin B. Barmatz, Glendale; Dan Granett, Los Angeles; Mark C. Lee, LaCanada, all of Calif.

[73] Assignee: The United States of America as represented by the United States National Aeronautics and Space Administration, Washington, D.C.

[21] Appl. No.: 561,433

[22] Filed: Dec. 14, 1983

[51] Int. Cl.[4] ............................................. G10K 10/00
[52] U.S. Cl. ....................................................... 73/505
[58] Field of Search ......................... 73/505, 662, 663; 366/112; 310/322

[56] References Cited

U.S. PATENT DOCUMENTS 3,882,732  5/1975  Fletcher et al. ...................... 73/505
4,463,606  8/1984  Barmatz ................................ 73/505

Primary Examiner—Stewart J. Levy
Assistant Examiner—John E. Chapman, Jr.
Attorney, Agent, or Firm—Paul F. McCaul; John R. Manning; Thomas H. Jones

[57] ABSTRACT

Systems are described for the acoustic levitation of objects, which enable the use of a sealed rigid chamber to avoid contamination of the levitated object. The apparatus includes a housing forming a substantially closed chamber, and means for vibrating the entire housing at a frequency that produces an acoustic standing wave pattern within the chamber.

14 Claims, 5 Drawing Figures

VIBRATING-CHAMBER LEVITATION SYSTEMS

ORIGIN OF INVENTION

The invention described herein was made in the performance of work under a NASA contract and is subject to the provisions of provisions of Public Law 96-517 (35 USC 202) in which the contractor has elected not to retain title.

BACKGROUND OF THE INVENTION

Acoustic levitation is useful to support an object without touching it with a solid support that could contaminate it, especially when the object is heated to a temperature at which it is molten. Two techniques have been used to couple an acoustic transducer to the atmosphere within a chamber. One technique is to place a transducer in direct contact with the atmosphere within the chamber, and the other is to place the transducer in contact with a chamber wall to vibrate the wall. When the acoustic transducer is in direct contact with the atmosphere in the chamber, there can be danger of contamination of the atmosphere by the transducer. In addition, a temperature gradient must be established along the chamber if the object is heated to a high temperature, since available transducers cannot withstand high temperatures. Where the transducer directly vibrates a wall of the chamber, there can be a loss of efficiency by the need to transmit acoustic energy through a chamber wall. A system for establishing an acoustic standing wave pattern within a chamber, without the need to place a transducer in contact with the atmosphere of the chamber or to pass the vibrations through a flexible wall of a chamber, could aid in avoiding contamination of the leviated object and enable more intense standing wave patterns to be generated.

SUMMARY OF THE INVENTION

In accordance with one emboidment of the present invention, a method and apparatus are provided for establishing an acoustic standing wave pattern within a housing that forms a chamber, in a manner than minimizes contamination of the chamber and which enhances the generation of acoustic waves of high intensity within the chamber. The apparatus includes a means for rapidly moving substantially all of the housing back and forth along at least one axis, at a frequency that produces an acoustic standing wave pattern within the chamber.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
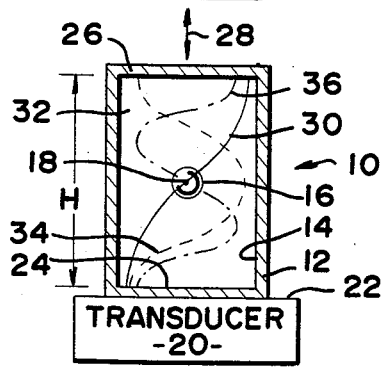
FIG. 1 is a sectional view of an acoustic levitation system constructed in accordance with the present invention.

FIG. 1 illustrates an acoustic levitation system 10 which includes a housing 12 that forms a levitation chamber 14 which surrounds an object 16. The object 16 is held near the position 18 against the force of gravity, by the forces applied by an acoustic standing wave pattern generated by a transducer 20. The transducer 20 may be any of a variety of types, such as a piezo-electric type in which a crystal undergoes changes in thickness, or a loudspeaker coil type. The transducer has an upper surface 22 that vibrates up and down, and the housing 12 is fastened to that surface 22. As a result, the entire housing 12, including the bottom and top walls 24, 26 of the chamber move back and forth along a vertical axis 28 in synchronism. If a proper frequency is chosen, an acoustic standing wave pattern will be produced within the chamber, which has a minimum acoustic force potential at the location 18.

The lowest acoustic frequency which is resonant to the height of the chamber 14, is one which produces a wave length indicated at 30, which is equal to twice the height of the chamber. In this lowest mode, which may be referred to as the first mode, the pressure at the bottom wall 24 must be a maximum at the same time as the pressure at the upper wall 26 is a minimum. This occurs when vibrating the entire chamber, since the bottom wall 24 is moving upward to compress the gas at the bottom of the chamber at the same time as the upper wall 26 is moving upward to minimize the pressure at the top of the chamber (its pressures are out-of-phase). If only the bottom wall of the chamber were vibrated, as in prior art levitation systems, then the next higher or second mode, wherein the wavelength indicated at 34 equals the height of the chamber, would also be resonant to the height of the chamber. However, the second mode is not resonant to the chamber when the top and bottom walls are vibrated in synchronism (both move up at the same time, and both move down at the same time), because the wavelength 34 requires maximum acoustic pressure at the bottom and top of the chamber at the same time (i.e. the pressures are in phase). The third lowest, or third mode, which has a wavelength indicated at 36 equal to two thirds the height of the chamber, is also resonant to the system 10. The third lowest mode is similar to the fundamental in that the pressure at the top of the chamber is minimum at the time that the pressure at the bottom is maximum. Thus, the lowest mode indicated at 30, and the other higher odd modes are resonant to the height of the chamber when the entire chamber is vibrated vertically.

The acoustic levitation of the object 18 by vibrating the entire chamber to move the lower and upper walls together, has an advantage over prior systems of enabling a sealed chamber to be used while also efficiently coupling vibrations of the transducer to the gas within the chamber. In one type of prior system, acoustic energy was transmitted from a transducer through a tube that passed through one wall such as 24 of the chamber. The transducer therefore was in direct contact with gas in the chamber, and outgassing of certain diaphragm transducers could result in contamination of the gas within the chamber. In another type of prior art system, a transducer was coupled to the middle of a thin flexible wall to vibrate it. This required the use of a wall which could vibrate, and there was often poor transmission of acoustic energy through such a wall. By vibrating the entire chamber, applicant enables the use of a rigid chamber without any openings in it, to enclose and levitate an object. It is also noted that since applicant vibrates both opposite walls 24 and 26 of the chamber, there is a greater intensity of sound within the chamber than when only one wall of the chamber is vibrated.

The system of FIG. 1 shows levitation in only the vertical direction, but not in sideward directions. While such sideward levitation can be accomplished by other means, it is convenient to use a single transducer to levitate in all three dimensions. This can be accomplished by using resonant chambers that have some section of their walls that is not parallel or perpendicular to the axis of vibration. Under these conditions, the surface motion of this wall section can be separated into components that may lead to chamber resonances that are not only along the axis of vibration.

Figure 2:
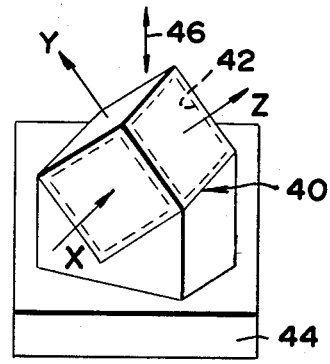
FIG. 2 is a perspective view of a levitation system of another embodiment of the invention.

FIG. 2 shows a housing 40 with a chamber 42 of parallelepiped shape of rectangular cross-sections, which is vibrated by a transducer 44. The chamber is oriented so that the x and y axes are angled by 48.2° each from the vertical and the z axis is angled 70.5° from the vertical. When the chamber is vibrated vertically along an axis 46, an acoustic standing wave pattern will be established to fix the position of an object within the chamber. The resonant frequency is one which produces a wavelength equal to $$[l_x^{-2}+l_y^{-2}+l_z^{-2}/4]^{-\frac{1}{2}},$$

where $l_x$, $l_y$ and $l_z$ are the dimensions of the chamber along the x, y, and z axis, for the above angles.

For a parallelepiped having sides of lengths $l_x$, $l_y$, and $l_z$, equations can be given to the optimum levitation angles between the vertical and the three chamber axes. For the lowest mode which produces levitation at a single location, the optimum angles are given by the following equations:

$$\cos\theta_x = \left[1+\left(\frac{l_x}{l_y}\right)^2+\frac{1}{4}\left(\frac{l_x}{l_z}\right)^2\right]^{-\frac{1}{2}}$$

$$\cos\theta_y = \left[1+\left(\frac{l_y}{l_x}\right)^2+\frac{1}{4}\left(\frac{l_y}{l_z}\right)^2\right]^{-\frac{1}{2}}$$

$$\cos\theta_z = \left[1+4\left(\frac{l_z}{l_x}\right)^2+4\left(\frac{l_z}{l_y}\right)^2\right]^{-\frac{1}{2}}$$

where $\theta_x$, $\theta_y$ and $\theta_z$ are the angles of the axes X, Y and Z from the vertical. Of course, each angle can be obtained by calculating the arc cosine of each cosine.

Figure 3:
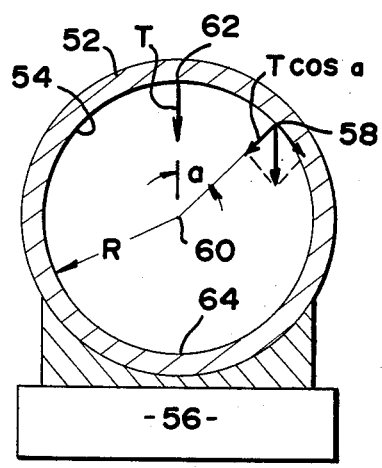
FIG. 3 is a sectional view of an acoustic levitation system which includes a spherical chamber, in accordance with another embodiment of the invention.

FIG. 3 illustrates a housing 52 which forms a spherical chamber 54. A transducer 56 vibrates the housing at a frequency which establishes a standing wave pattern within the chamber with a location(s) of minimum acoustic force potential that is spaced from the walls of the chamber to levitate an object in the chamber. When a lowest spherical mode is applied which produces waves of a length equal to 3.02R, where R is the radius of the sphere, different points on the surface of the sphere vibrate in a radial direction at an intensity equal to Tcos a, where T is the intensity of vertical excursions of points at the top and bottom of the sphere, and a is the angle of a point such as 58 from the uppermost point of the sphere. This results in an acoustic pressure node such as a horizontal plane passing through the center 60 of the sphere, and this results in an acoustic force potential which is a minimum at the center of the sphere. Accordingly, an object placed in the vibrating sphere, will gravitate towards the center point 60 of the sphere.

Applicant has constructed and tested a levitation system of the type shown in FIG. 3. By using a piezoelectric transducer, applicant was able to levitate an object constructed of nylon, havng a density of 1.1. Even denser objects could have been levitated, except that the transducer, the chamber walls, and the gas in the chamber began to heat. At a higher temperature a higher frequency must be applied to create resonance in a chamber of give dimension, but the transducer was efficient only near one frequency.

In FIG. 3, the same mode which results in an object gravitating towards the center of the sphere can be produced by passing acoustic waves through a tube connected to the top or bottom of the sphere at 62 or 64. However, the Q of the spherical chamber will decrease in accordance with the area occupied by the tube through which acoustic waves enter the chamber. A decrease in Q results in a lower intensity of acoustic standing wave pattern for a given acoustic energy input. The other advantages, of vibrating all surfaces of the resonator and of permitting a rigid sealed container to be used, are also achieved by the present invention.

Figure 4:
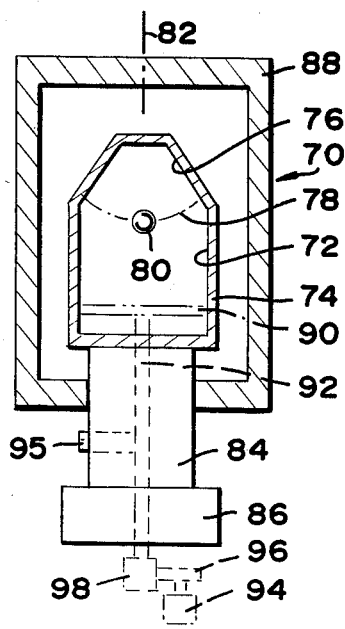
FIG. 4 is a sectional view of an acoustic levitation system with a chamber having angled upper walls, in accordance with another embodiment of the invention.

FIG. 4 illustrates another acoustic levitation system 70 which includes an acoustic chamber 72 within a housing 74, where the chamber is of substantially constant cross-sections such as circular or rectangular, along most of the chamber height. This type of chamber has upper walls at 76 that are angled towards one another in an upward direction, to produce a minimum acoustic potential surface 78 which is curved. An object 80 will be levitated on or near the surface, and will be urged toward the vertical center line 82 of the chamber by gravity (or other downward-directed force such as an electrostatic force). The housing 74 forming the chamber is connected through a heat-resistant horn 84 of greater height than width to a transducer 86. As in the other embodiments of the invention, the vibrating chamber is substantially fixed to a vibrating surface of the transducer.

The vibrating chamber 74 is enclosed within a furnace 88 which heats the chamber and the object therein to a high temperature, such as one at which the object becomes molten. The horn coupling 84 permits the transducer 86 to remain at a relatively low temperature which the transducer can withstand, while the chamber housing 74 and object are heated to a much higher temperature, and with the chamber being at a substantially uniform high temperature. This avoids large temperature gradients within the gaseous medium of a chamber, which can reduce the intensity of the acoustic standing wave pattern.

In the system 70 of FIG. 4, the effective height of the chamber 72 could be made adjustable by the use of a moveable bottom wall member 90 (or a top member at 76) that can be moved up and down within the chamber. This can be accomplished by using a shaft 92 to support the wall and using threads on the shaft 92 that engage a threaded hole in the horn 84. A lower end of the shaft 92 can pass through a hole in the transducer 86, and the shaft can be turned to change its height relative to the chamber by a motor 94 that drives a gear 96 that turns another gear 98 fixed to the bottom of the shaft 92. A clamp 95 can be used to clamp the shaft in place after each movement. An acoustic pressure sensor at the top or bottom wall can be used to control the motor 94 to maintain resonance.

Figure 5:
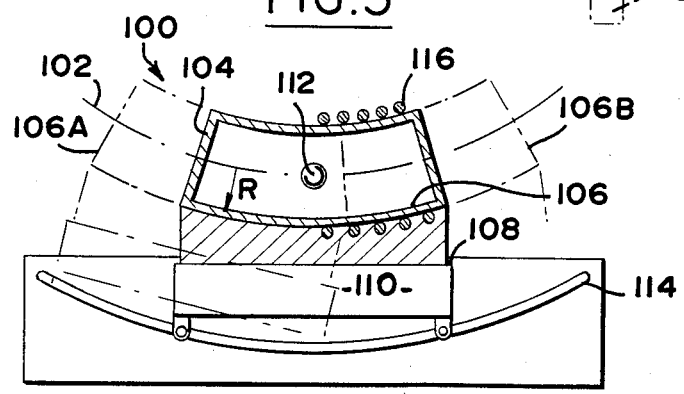
FIG. 5 is a sectional view of an acoustic levitation system which includes a chamber which is largely cylindrical but with a curved axis, in accordance with another embodiment of the invention.

FIG. 5 illustrates another acoustic levitation system 100 which is of largely cylindrical shape, in that it has a circular cross-section everywhere along its axis 102. However, the axis 102 is curved about a point lying above the chamber. The housing 104 that forms the largely cylindrical chamber 106 is fixed to the surface 108 of the transducer 110 that vibrates the chamber 106 vertically. A frequency which produces a wave length of 3.41R in the chamber 106, where R is the radius of the chamber, results in objects such as 112 being urged towards the axis 102 of the chamber. The fact that the axis 102 is curved, results in gravity urging the object 112 towards the lowest point of the curve, so that its position along the axis 102 is stabilized. The chamber and transducer can be moved as a unit along a guide 114 which is curved about the same point as the cylinder axis 102. Accordingly, the chamber 106 can be moved, as to the position 106A, without moving the object 112. In one example, the chamber includes a heating coil 116 which encircles only one end portion of the chamber. The chamber can be moved to the position 106A so the object 112 is surrounded by the heating coil and is heated. Then the chamber can be moved to the position 106B, where the heating coil is moved away from the object at 112, to allow the object to cool.

While the curved largely-cylindrical chamber 106 of FIG. 5 can levitate an object by shaking the chamber, it can also be used by applying acoustic energy without shaking it. The curved axis 102 will then position an object at the lowest position along a curved levitation line or surface.

Thus, the invention provides an apparatus and method for establishing an acoustic standing wave pattern within a housing that forms a substantially closed chamber. This is accomplished by vibrating opposite walls of the chamber in unison, as by rapidly moving substantially all of the housing that forms the chamber back and forth along a predetermined axis, at a frequency which produces an acoustic standing wave pattern within the chamber. The housing can be fixed to a vibrating surface of a transducer to vibrate the housing. Various configurations can be used to allow a single transducer vibrating a chamber along a single axis, to confine an acoustically levitated object to a location near a predetermined point within the chamber.

Although particular embodiments of the invention have been described and illustrated herein, it is recognized that modification and variations may readily occur to those skilled in the art and consequently, it is intended that the claims be interpreted to cover such modifications and equivalents.

What is claimed is:

1. Apparatus for establishing an acoustic standing wave pattern comprising:
a housing that forms a substantially closed chamber, and
means for moving all of said housing in a substantially undistorted state back and forth along at least a predetermined axis at a frequency which produces an accoustic standing wave pattern within said chamber, whereby to maintain an essentially constant position for a levitated object.

2. The apparatus described in claim 1 wherein:
said means for moving includes a transducer having a vibrating surface, and said housing is mounted to said vibrating surface.

3. The apparatus described in claim 1 wherein:
said chamber has a substantially uniform cross-section along most of a predetermined length dimension, and said means vibrates said chamber along said length dimension and vibrates it at a resonant frequency which produces acoustic pressure variations, at opposite reflecting walls, that are out of phase.

4. The apparatus described in claim 1 wherein:
said chamber is of substantially parallelepiped shape, with rectangular cross-sections, said chamber has three axis X, Y, and Z, and has lengths along said axis of $l_x$, $l_y$ and $l_z$;
the axes of said chamber are oriented at angles $\theta_x$, $\theta_y$ and $\theta_z$ from the vertical, said angles being given by the equations:

$$\cos \theta_x = \left[ 1 + \left(\frac{l_x}{l_y}\right)^2 + \tfrac{1}{4}\left(\frac{l_x}{l_z}\right)^2 \right]^{-\frac{1}{2}}$$

$$\cos \theta_y = \left[ 1 + \left(\frac{l_y}{l_x}\right)^2 + \tfrac{1}{4}\left(\frac{l_y}{l_z}\right)^2 \right]^{-\frac{1}{2}}$$

$$\cos \theta_z = \left[ 1 + 4\left(\frac{l_z}{l_x}\right)^2 + 4\left(\frac{l_z}{l_y}\right)^2 \right]^{-\frac{1}{2}}$$

5. The apparatus described in claim 1 wherein:
said chamber is of substantially parallelepiped shape, with rectangular cross-sections, and said means vibrates all of said chamber along an axis of vibration that subtends an angle of about 48° with both an X and a Y chamber axis and subtends an angle of about 70° with a Z axis; and
said chamber has lengths along said axes of $l_x$, $l_y$ and $l_z$, and said frequency is one which produces a wavelength equal to $[l_x^{-2}+l_y^{-2}+l_z^{-2}/4]^{-\frac{1}{2}}$.

6. The apparatus described in claim 1 wherein:
said chamber is of largely cylindrical shape, but with the axis of the cylindrical shape being curved about an axis lying above the chamber, and said means vibrates said chamber about a vertical axis, whereby to fix the location of a levitated object when said chamber is subjected to gravity or other downward directed force field.

7. The apparatus described in claim 6 including:
means for guiding said chamber in movement along said curved axis, whereby to maintain an essentially constant position for a levitated object.

8. The apparatus described in claim 1 wherein:
said chamber is of spherical shape.

9. Apparatus for establishing an acoustic standing pattern comprising:
a chamber formed by walls, and
means for vibrating all of the walls of said chamber in the same direction at the same time with the chamber in a substantially undistorted state at a frequency which is resonant to said chamber, whereby to maintain an essentially constant position for a levitated object.

10. The apparatus described in claim 9 including:
means for heating said chamber walls to heat the entire volume within said chamber, and wherein;
said vibrating means includes a transducer spaced from said chamber and at a lower temperature than all portions of said chamber, and a horn coupling said transducer to said chamber walls to vibrate all of the walls of said chamber.

11. Apparatus for levitating an object comprising:
walls forming a chamber of largely cylindrical shape, but with the axis of the cylindrical shape being curved about an axis lying above the cylinder, and
means for vibrating all the chamber walls, with the chamber in a substantially undistorted state, whereby an acoustic standing wave pattern is established within said chamber along its diameter.

12. A method for establishing an acoustic standing wave pattern within a chamber formed by a housing, comprising:
rapidly moving all of said housing back and forth with the housing in a substantially undistorted state, at a frequency which produces a standing wave pattern within said chamber, whereby to maintain an essentially constant position for a levitated object.

13. The method described in claim 12 wherein:
said step of rapidly moving comprises attaching said housing to a surface of a transducer, and energizing said transducer to vibrate said surface.

14. The method described in claim 12 wherein:
said chamber is of uniform cross-section along most of a predetermined height direction, and said step of vibrating includes vibrating said chamber along said height direction at a resonant frequency which produces acoustic pressure variation, at opposite reflecting walls, that are out of phase.

* * * * *